United States Patent

[11] 3,569,853

[72] Inventor Chester J. Wolejsza, Jr.
Rockville, Md.

[21] Appl. No. 838,189
[22] Filed July 1, 1969
[45] Patented Mar. 9, 1971
[73] Assignee Communications Satellite Corporation

[54] PHASE-LOCK LOOP WITH TANGENT FUNCTION PHASE COMPARATOR
6 Claims, 5 Drawing Figs.

[52] U.S. Cl. 331/22, 307/232, 325/423, 328/133, 331/25
[51] Int. Cl. H03b 3/04, H03d 13/00
[50] Field of Search 331/18, 22, 25, 12; 325/419, 423; 328/133, 134; 307/232

[56] References Cited
UNITED STATES PATENTS

| | | | |
|---|---|---|---|
| 2,997,577 | 8/1961 | Kaminski et al. | 325/423X |
| 3,204,185 | 8/1965 | Robinson | 325/419 |
| 3,456,196 | 7/1969 | Schneider | 325/419X |

*Primary Examiner*—Roy Lake
*Assistant Examiner*—Siegfried H. Grimm
*Attorneys*—J. Frank Osha and Thomas A. Gallagher

ABSTRACT: An improved tanlock phase-lock loop phase comparator generates the signals approximating $y=(l+k)\sin\phi$ and $x=k\cos\phi$ in response to a pair of input signals $A\sin(\omega_1 t+\theta_1)$ and $A\cos(\omega_2 t+\theta_2)$ where $\phi=\theta_1-\theta_2$. The signal $k\cos\phi$ is operated on by a nonlinear circuit element having a transfer function approximating $1/1+x$ to produce a signal $z$. Signals $y$ and $z$ are multiplied to provide the desired output approximating the form $(1+k)\sin\phi/1+k\cos\phi$.

INVENTOR
CHESTER J. WOLEJSZA, JR.
BY
ATTORNEYS

INVENTOR
CHESTER J. WOLEJSZA, JR.

BY Thomas A. Gallagher
J. Tom DeDolin
ATTORNEYS

PHASE-LOCK LOOP WITH TANGENT FUNCTION PHASE COMPARATOR

BACKGROUND OF THE INVENTION

The invention relates generally to phase-lock loop apparatus and more particularly to an improved phase-lock loop having a phase comparator characteristic approximating the form $$f(\phi)=\frac{(l+k)\ \sin\ \phi}{l+k\ \cos\ \phi}$$

A prior art phase-lock loop apparatus having a phase comparator characteristic of the above form, known as the "tanlock" because of its similarity to the identity $$\frac{\sin\ x}{1+\cos\ x}=\tan\frac{x}{2}$$

is described in U.S. Pat. No. 3,204,185 issued to Lorne M. Robinson on Aug. 31, 1965 and in an article "Tanlock: A Phase-Lock Loop of Extended Tracking Capability" by L.M. Robinson in Proceedings 1962 Conv. on Military Electronics, Feb. 7—9, Los Angeles, Calif. As explained in more detail in these references, the tanlock is capable of locking onto the phase of an externally applied signal although the difference in phase between that signal and the local signal is as great as the order of ±180°. Conventional phase-lock loop phase comparators have a sine function response; consequently phase lock is lost when the difference between the input and local signal phases becomes greater than ±90°. In addition, the tanlock has been found to provide faster acquisition of modulated or unmodulated carriers in the presence of noise levels above those in which the conventional loop is capable of operating. Also, the frequency range over which the tanlock can track is greater than that of the conventional loop in the range above the noise threshold.

While providing an improvement over conventional phase-lock loop apparatus, the prior art tanlock is difficult to implement. More specifically, in one embodiment the analogue divider used to provide the modified phase comparator function is a complex and expensive device that tends to be unstable particularly in systems wherein random noise is present. In an alternative embodiment having an analogue multiplier, a complex approach is used to generate one of the input signals to the multiplier.

SUMMARY OF THE INVENTION

A phase-lock loop apparatus is provided having an externally applied signal A sin ($\omega 1t$ + $\Theta_1$) and an internally generated signal A cos ($\omega_2 t$ + $\Theta_2$). It is desired to lock these two signals in frequency and phase. The phase error or difference between the signals is defined as $\Phi = \Theta_2 - \Theta_1$, where $\Theta_1$ and $\Theta_2$ are the relative phase angles of each signal, respectively. The terms $\omega_1$ and $\omega_2$ represent the frequencies of each signal in radians. Ordinarily, $\omega_1$ and $\omega_2$ can be made close initially if the external signal frequency is known approximately and by adjusting the local signal frequency to be close to it. As the phase difference is reduced in the phase-lock loop, the frequency difference also reduces. The two signals may be treated as having the same amplitude A because this is easily achieved by passing the signals through limiters. A pair of multipliers and a 90° phase shifter provide sin Φ and cos Φ outputs that are multiplied by ( 1+$k$) and $k$, respectively to produce $y$ = (1+$k$) sin Φ and $x$ = $k$ cos Φrespectively, where the term $k$ is a constant. The $x$ signal is applied to a nonlinear element having a transfer function approximating 1/1+$x$ to thereby generate $$z\cong\frac{1}{l+k\ \cos\ \phi}$$

An analogue multiplier operates on $y$ and $z$ to form their product $$\cong\frac{(l+k)\ \sin\ \phi}{l+k\ \cos\ \phi}$$

the desired substantially tangent function. Thus, the function may be generated in a straightforward manner and without an analogue divider. Moreover, it has been found that the analogue nonlinear characteristic need not adhere with great accuracy to the form 1/1+$x$ in order to achieve a usable tanlock response.

DETAILED DESCRIPTION OF THE DRAWINGS

Figure 2:
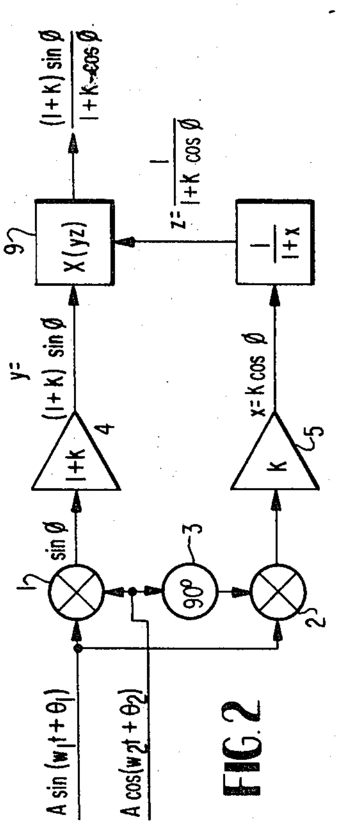
FIG. 2 is a block diagram of an embodiment of the improved tanlock phase comparator circuit according to this invention.

Whenever possible the same reference numerals are carried through the various FIGS.

Figure 1:
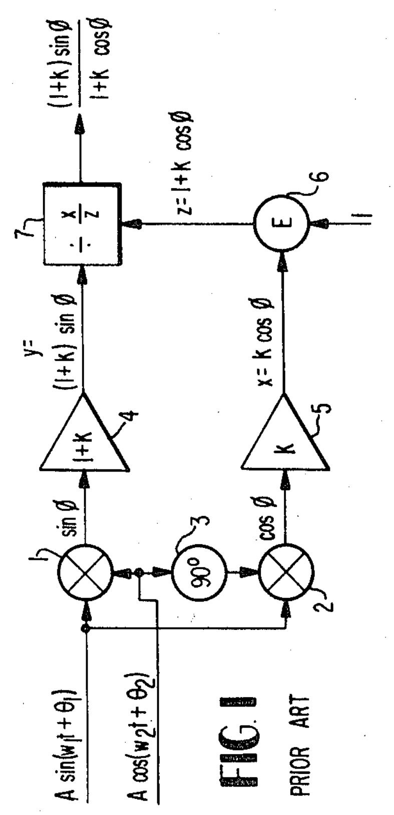
FIG. 1 PRIOR ART
FIG. 1 is a block diagram of the tanlock phase comparator circuit according to the prior art.

The invention will be best understood by reference first to the prior art tanlock circuit of FIG. 1, wherein a first signal A sin ($\omega_1 t + \Theta_1$) is applied to a first multiplier 1 and to a second multiplier 2. Multipliers 1 and 2 may be conventional mixers or balanced modulators, for + A second signal A cos ($\omega_2 t$ + $\Theta_2$) is applied to the multiplier 1 and to a 90° phase shifter 3. The second signal shifted in phase by 90° becomes A sin ($\omega_2 t$ + $\Theta_2$) and is applied to a multiplier 2. According to conventional phase-lock loop theory, the outputs of multipliers 1 and 2 will be sin Φ and cos Φ, respectively, where $\Phi = \Theta_2 - \Theta_1$. The sin Φ signal is operated on by an amplifier 4 having an amplification factor of (1 +$k$) thereby effectively multiplying sin Φ by (1 +$k$) to produce a signal $y$ = (1 +$k$) sin Φ at its output. In a similar manner amplifier 5 provides $k$ cos Φ at its output that is applied to a summation means 6 where it is added to a signal representing the unit value 1 to provide $z$ = 1+$k$ cos Φ. The $y$ signal is divided by the $z$ signal in an analogue divider 7 to provide the desired function (1+$k$)sin Φ/1+$k$ cos Φ. It will be noted that for $k$ = 0, the function reduces to the conventional sin Φ phase-lock comparator function. As indicated hereinbefore, a stable analogue divider is a difficult device to realize physically.

FIG. 2 shows an embodiment of the tanlock according to this invention. As in the prior art, the signals $y$ = (1 +$k$) sin Φ and $x$ = $k$ cos Φ are generated at the outputs of amplifiers 4 and 5, respectively. Signal $x$ is applied to a nonlinear means 8 having a transfer function 1/1+$x$ to generate a signal $$z=\frac{1}{l+k\ \cos\ \phi}$$

Figure 3:
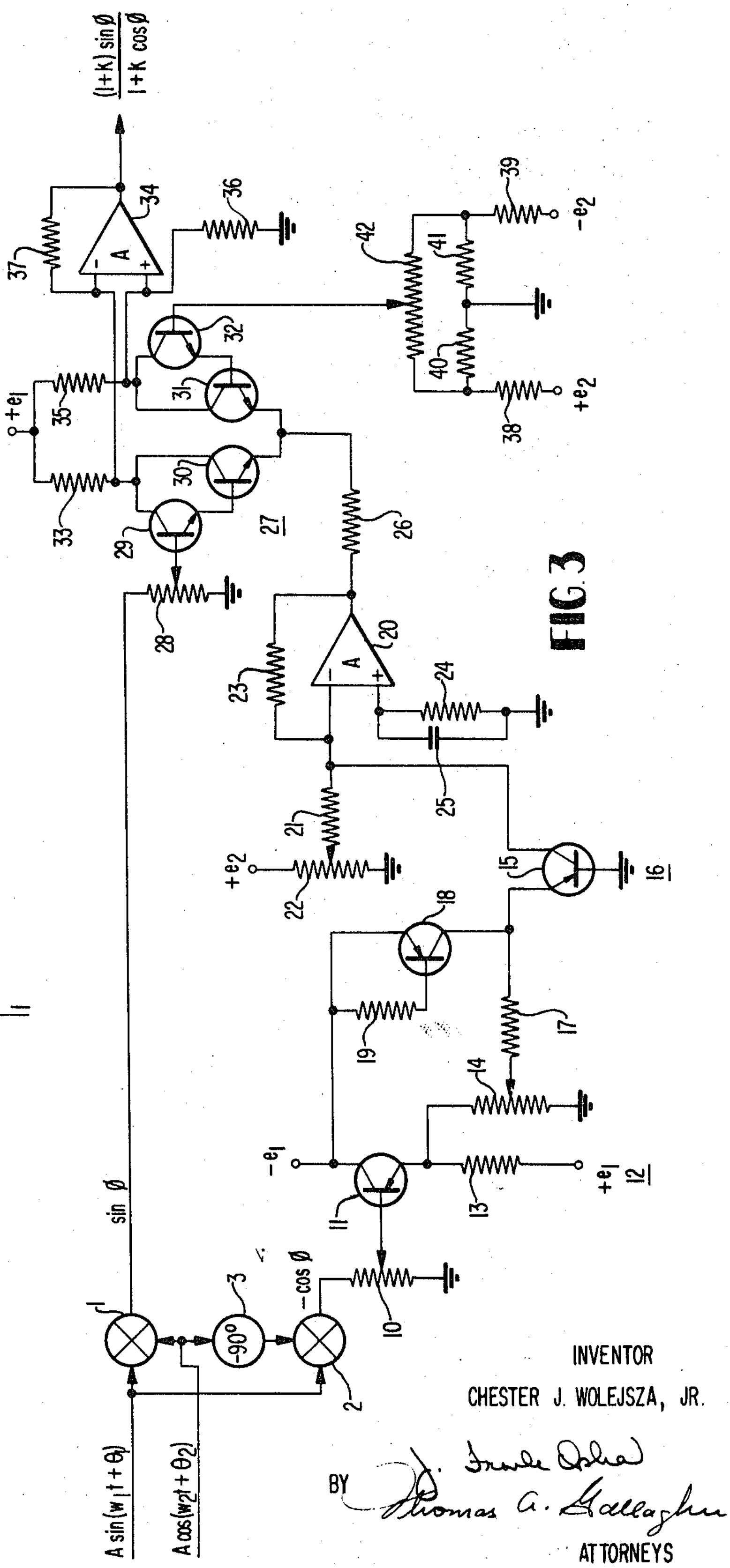
FIG. 3 is a schematic diagram of an embodiment of the improved phase comparator circuit according to this invention.

A specific circuit having a suitable transfer function is described in the discussion of FIG. 3. Signals $y$ and $z$ are multiplied in an analogue multiplier 9 to provide the desired tanlock output approximating (1+$k$)sin Φ/1+$k$ cos Φ.

The function 1/1+$x$ of block 8 may be approximated, for example, by an exponential source such as the PN junction of a diode or transistor. In the case of a grounded base PNP transistor, if the emitter-base voltage is $V_{EB}$, then the collector current is $K_1 e^{k_2 V_{EB}}$, where $k_1$ and $k2$ are transistor parameters. By trigonometric identities it can be shown that for $k$=0.8, $$\frac{1}{l+k\ \cos\ \phi}=\frac{1}{2}(1-e^{-2\cos\phi})$$

Instead of an exponential source, a logarithmic source of hyperbolic source such as a sin $h$ or cos $h$ generator could be used. Such generators are well known in the prior art and their incorporation into this invention would be readily apparent to one of ordinary skill in this art in light of the teachings herein.

Referring now to FIG. 3 of the drawings wherein a schematic diagram of a preferred embodiment of the improved tanlock phase comparator circuit according to the present invention is shown. The same signal inputs are available as in FIG. 2, however in this case phase shifter 3 is −90°, causing the output of phase detector 2 to be −cos Φ. A potentiometer 10 controls input to the base of PNP transistor 11 that operates as a buffer stage The collector of transistor 11 is connected to a negative voltage source $-e_1$ and the emitter is connected to a positive voltage source $+e_1$ through a resistor 13. The buffer stage output is taken across a potentiometer 14 and is applied to the emitter of a PNP transistor 15 that functions as an exponential voltage source stage 16. A resistor 17 and a transistor 18 provide a temperature compensation. The emitter of transistor 18 is connected to the negative voltage source $-e_1$ and the base is connected to the same source through a resistor 19. Exponential voltage source transistor 15 is in a grounded base configuration and its collector output is applied to the negative input of an operational amplifier 20. An adjustable positive voltage is also applied to the operational amplifier negative input through a resistor 21 connected to a potentiometer 22 that is between ground and positive voltage $-e_2$. Operational amplifier 20 has a feedback resistor 23 to its negative input and a parallel resistor 24 and capacitor 25 to ground at its positive input. The operational amplifier output $1/1+k \cos \Phi$ is applied through a resistor 26 to a dual Darlington configuration 27 that functions as an analogue multiplier. The constant $k$ may be adjusted by the potentiometers 10 and 14, and the value 1 is set by potentiometer 22. The sin Φ signal from multiplier 1 is applied to multiplier 27 through a potentiometer 28. Multiplier 27 is comprised of NPN transistors 29, 30, 31 and 32. The emitters of transistors 30 and 31 are connected together and to resistor 26. The base of transistor 30 is connected to the emitter of transistor 29. The collectors of transistors 29 and 30 are connected together and to voltage source $+e_1$ through a resistor 33 and to the negative input of an operational amplifier 34. Transistor 31 has its base connected to the emitter of transistor 32. The collectors of transistors 31 and 32 are connected together and to voltage source $+e_1$ through a resistor 35 and to the positive input of operational amplifiers 34 and to ground through a resistor 36. Operational amplifier 34 has a feedback resistor 37 from its output to the negative input. The base of transistor 32 is connected to a potentiometer 42 that is connected across voltage sources $+e_2$ and $-e_2$ through a pair of resistors 38 and 39, respectively. A pair of series resistors 40 and 41, whose center is connected to ground, are connected across potentiometer 42. Potentiometer 28 functions to adjust the $(1+k)$ multiplication factor and potentiometer 42 balances the multiplier so that for zero input there is zero output. The sin Φ and $1/1+a0k \cos \Phi$ terms are multiplied to provide $(1+k) \sin \Phi/1+k \cos \Phi$ at the output of operational amplifier 34.

Figure 4:
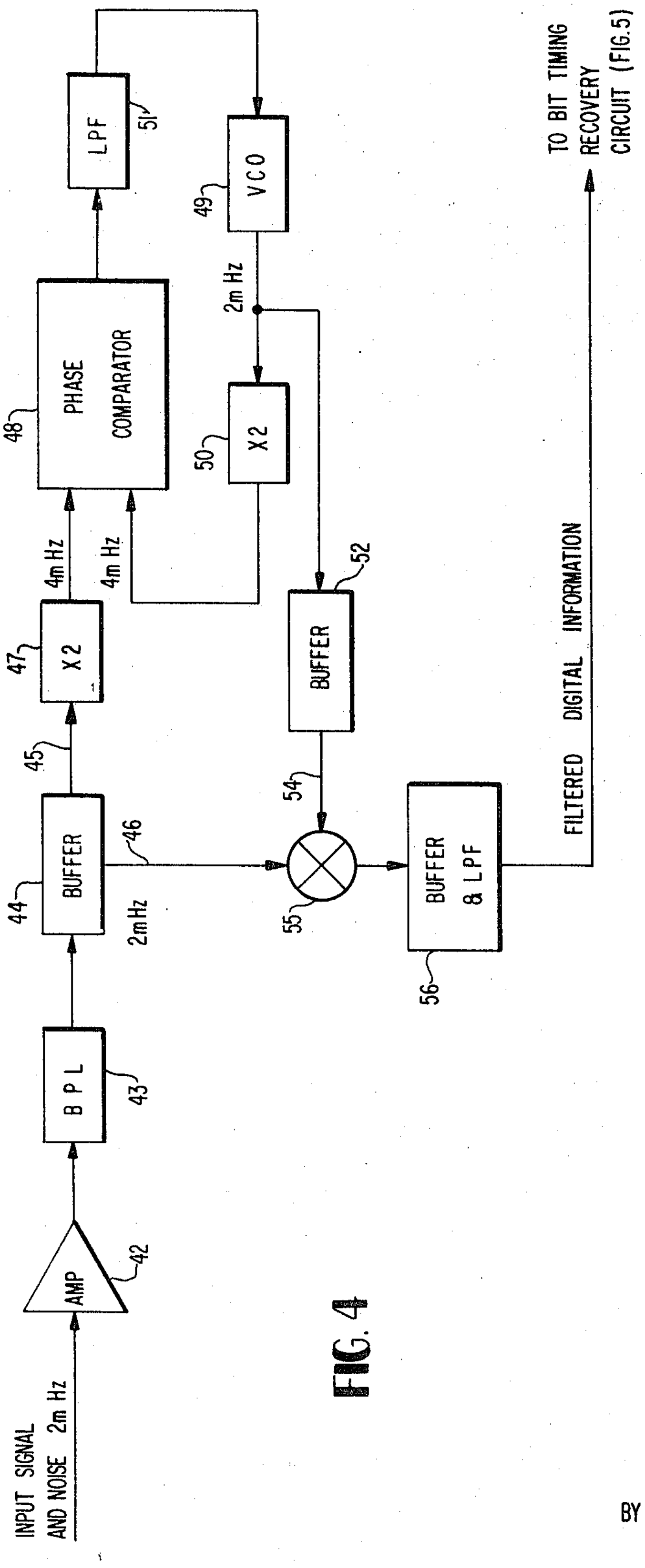
FIG. 4 is a block diagram of an embodiment of the improved tanlock phase comparator in a carrier recovery loop circuit according to this invention.

Referring now to FIG. 4, the improved tanlock phase comparator is shown in a carrier recovery loop circuit of a communications receiver. The purpose of this circuit is to acquire and lock onto the frequency and phase of the received signal's carrier. Assume an input signal and noise 2 MHz. modulated with 0° and 180° phase shift keyed (PSK) digital information. The signal and noise are amplified in an amplifier 42 and applied to a band-pass limiter (BPL) 43 so that removes amplitude variations from the signals. The limited signal is passed to a buffer 44 which provides two identical output signals on lines 45 and 46. The signal on line 45 is doubled in frequency by a times two frequency doubler 47. As is well known in the art, frequency doubling a PSK signal regenerates the signal carrier component and tends to remove the modulation component permitting carrier acquisition and lock retention. Thus a 4 MHz. carrier without modulation is applied to the improved tanlock phase comparator 48. Comparator 48 is of the type described in the embodiments of FIGS. 2 and 3. The second input to comparator 48 is the frequency-doubled output of voltage-controlled oscillator (VCO) 49. VCO 49 is nominally at the expected frequency of the input signal to amplifier 42 and it is desired to lock the VCO frequency and phase to that of the input signal as rapidly as possible and to retain the lock. The VCO output is doubled in a times two frequency doubler 50. Phase comparator 48 has its output filtered by low-pass filter 51 whose output drives the VCO 49. The 2 MHz. VCO output is also applied to a buffer 52 and to multiplier 55. The signal on line 54 is in phase and frequency coherence with the signal on line 46, therefore multiplier 55, which may be a balanced modulator or mixer, for example, provides an output that is only the modulation component of the signal on line 46 that in this case is the digital information that was contained in the PSK modulation of the signal applied to amplifier 42. Multiplier 55 output is passed through a buffer and low-pass filter (LPF) 56 to provide filtered digital information to the bit-timing recovery unit such as that described in the discussion of FIG. 5.

Figure 5:
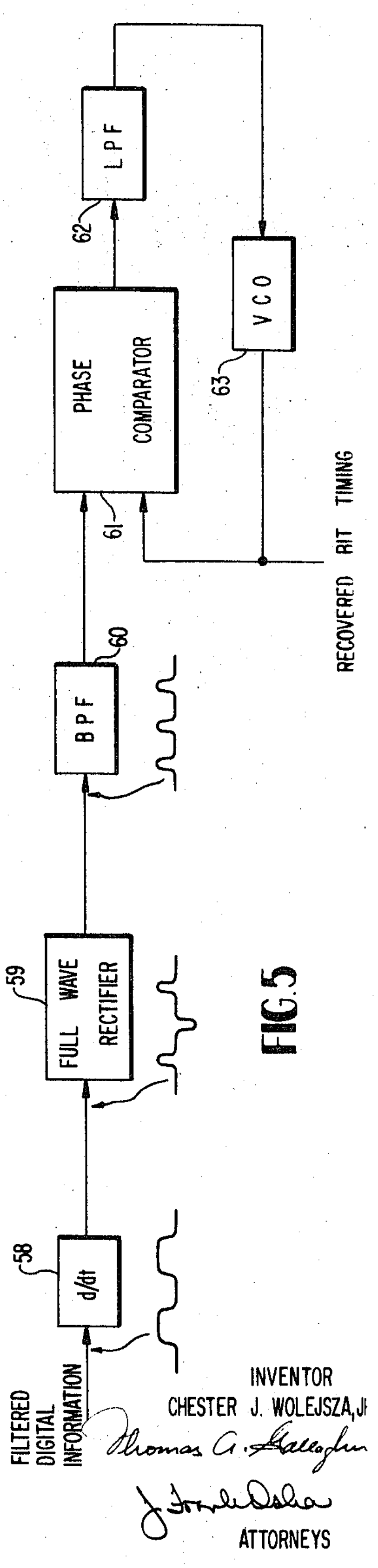
FIG. 5 is a block diagram of an embodiment of the improved tanlock phase comparator in a bit timing recovery loop circuit according to this invention.

Referring now to FIG. 5, a bit-timing recovery circuit embodying the improved tanlock phase comparator circuit is shown. The filtered data from block 56 of FIG. 4 is applied to a differentiator 58. Approximate waveforms are shown adjacent to points at which they are present. The differentiated signals are then applied to a full wave rectifier 59 to provide spikes that occur whenever the original digital signals go positive or negative. The rectifier output is applied to a band-pass filter (BPF) 60 whose frequency is centered at the information transmission frequency rate. Filter 60 tends to remove noise present on the signals. The output of filter 60 is applied as one of the signals to an improved tanlock phase comparator 61 of the form described in the discussion of FIGS. 2 and 3. The comparator 61 output is applied to low-pass filter 62 and to VCO 63 whose output is the second input to comparator 61. When phase lock is achieved, the output of VCO 63 provides an accurate signal for use in demodulation of the digital signals being received. The demodulator circuit is beyond the scope of this invention, however, many such circuits are well known in the art.

Obviously, numerous modifications and variations are possible in light of the above teachings. It is therefore to be understood that within the scope of the appended claims the invention may be practiced otherwise than as specifically described herein.

I claim:

1. In a phase comparator apparatus wherein an output signal approximating the form $(1k) \sin \Phi/1+k \cos \Phi$ is provided in response to a first input signal of the form A sin $(\omega_1 t + \Theta_1)$ and a second input signal of the form A cos $(\omega_2 t + \Theta_2)$, where $K$ is a constant and $\Phi = \Theta_1 - \Theta_2$, the combination comprising:

a. means responsive to a receiving said first and second input signals for providing a first output signal approximating the form sin Φ and a second output signal approximating the form cos Φ;

b. means responsive to and connecting to said first output signal for multiplying said signal by $(1+k)$ to provide a signal approximating the form $y = (1+k) \sin \Phi$;

c. means responsive to and connecting to said second output signal for multiplying said signal by $k$ to provide a signal approximating the form $x = k \cos \Phi$;

d. means responsive to and connecting to said signal $x=k \cos \Phi$ for providing an output signal that is a nonlinear function of said signal $x$, said output signal approximating the form $$z = \frac{1}{l + k \cos \phi}$$

e. means responsive to and connecting to said $y$ and $z$ signals for providing an output signal proportional to the product of said $y$ and $z$ signals, said output signal approximating the form $(1+k) \sin \Phi/1+k \cos \Phi$.

2. The combination according to claim 1 wherein said nonlinear means comprises means having a transfer function that is substantially exponential.

3. The combination according to claim 2 wherein said exponential function means includes a PN junction and means to bias said junction to provide a substantially exponential transfer characteristic.

4. In a phase-lock loop apparatus including a phase comparator having an output signal approximating the form $(1+k)\sin\Phi/1+k\cos\Phi$ in response to the first input signal of the form $A\sin(\omega_1 t+\Theta_1)$ and a second input signal of the form $A\cos(\omega_2 t\,\Theta_2)$, where $k$ is a constant and $\Phi=\Theta_1-\Theta_2$, the combination comprising:

1. A phase comparator comprising:
   a. means responsive to and receiving said first and second input signals for providing a first output signal approximating the form $\sin\Phi$ and a second output signal approximating the form $\cos\Phi$:
   b. means responsive to and connecting to said first output signal for multiplying said signal by $(1{=}k)$ to provide a signal approximating the form $y=(1+k)\sin\Phi$;
   c. means responsive to and connecting to said second output signal for multiplying said signal by $k$ to provide a signal approximating the form $x{=}k\cos\Phi$; d. means responsive to and connecting to said signal $x=k\cos\Phi$ for providing an output signal that is a nonlinear function of said signal $x$, said output signal approximating the form $$z=\frac{1}{l+k\cos\phi}$$

means responsive to and connecting to said $y$ and $z$ signals for providing a phase comparator output signal proportional to the product of said $y$ and $z$ signals, said phase comparator output signal approximating the form $(1+k)\sin\Phi/1+k\cos\Phi$;
2. voltage controlled means responsive to and connecting to said phase comparator output signal for providing an output signal having a frequency and phase that is a function of the voltage magnitude of said phase comparator output signal; and
3. means for applying said voltage controlled means output signal to said phase comparator as said second signal, whereby said second signal is substantially in frequency and phase coherence with said first signal when the phase-lock loop is in lock.

5. In a carrier recovery loop apparatus for providing a carrier signal in frequency and phase coherence with an input signal, said input signal characterized by a modulated carrier and noise, said apparatus including a phase-lock loop having a phase comparator of the type having an output signal approximating the form $(1+k)\sin\Phi/1+k\cos\Phi$ is provided in response to a first input signal of the form $A\sin(\omega_1 t+\Theta_1)$ and a second input signal of the form $A\cos(\omega_2 t+\Theta_2)$, where $k$ is a constant and $\Phi{=}\,\Theta_1$ 31 $\Theta_2$, the combination comprising:

1. a phase comparator comprising:
   a. means responsive to and receiving said first and second input signals for providing a first output signal approximating the form $\sin\Phi$ and a second output signal approximating the form $\cos\Phi$.
   b. means responsive to and connecting to said first output signal for multiplying said signal by $(1+k)$ to provide a signal approximating the form $y=(1+k)\sin\Phi$,
   c. means responsive to and connecting to said second output signal for multiplying said signal by $k$ to provide a signal approximating the form $x=k\cos\Phi$,
   d. means responsive to and connecting to said signal $y=k\cos\Phi$ for providing an output signal that is a nonlinear function of said signal $x$, said output signal approximating the form $$z=\frac{1}{l+k\cos\phi}$$

e. means responsive to and connecting to said $y$ and $z$ signals for providing an output signal proportional to the product of said $y$ and $z$ signals; said output signal approximating the form $(1+k)\sin\Phi/1+k\cos\Phi$.
2. voltage-controlled means responsive to and connecting to said phase comparator output signal for providing an output signal having a frequency and phase that is a function of the voltage magnitude of said phase comparator output signal;
3. means responsive to and connecting to said voltage-controlled means output for frequency doubling said signal,
4. means for applying said frequency doubled voltage-controlled means output signal to said phase comparator as said second signal;
5. means responsive to and receiving said input signal for frequency doubling said signal; and
6. means for applying said frequency doubled input signal to said phase comparator as said first signal whereby said voltage-controlled means output is a carrier signal substantially in frequency and phase coherence with said input signal when said phase-lock loop is lock.

6. In a bit-timing recovery loop apparatus for providing a pulse train in synchronism with the timing of received digital pulses, said apparatus including a phase-lock loop having a phase comparator of the type having an output signal approximating the form $(1+k)\sin\Phi/1+k\cos\Phi$ in response to a first input signal of the form $A\sin(\omega_2 t+\Theta_2)$, and a second input signal of the form $A\cos(\Theta_2 t+\Theta_2)$, where $k$ is a constant and $\Phi=-\Theta_2$, the combination comprising:

1. A phase comparator comprising:
   a. means responsive to and receiving said first and second input signals for providing a first output signal approximating the form $\sin\Phi$ and a second output approximating the form $\cos\Phi$;
   b. means responsive to and connecting to said first output signal for multiplying said signal by $(1+k)$ to provide a signal approximating the form $y=(1+k)\sin\Phi$,
   c. means responsive to and connecting to said second output signal for multiplying said signal by $k$ to provide a signal approximating the form $x=k\cos\Phi$,
   d. means responsive to and connecting to said signal $x=k\cos\Phi$ for providing an output signal that is a nonlinear function of said signal $x$, said output signal approximating the form $$z=\frac{1}{l+k\cos\phi}$$

e. means responsive to and connecting to said $y$ and $z$ signals for providing an output signal proportional to the product of said $y$ and $z$ signals, said output signal approximating the form $(1+k)\sin\Phi/1+k\cos\Phi$;
2. voltage controlled means responsive to and connecting to said phase comparator output signal for providing an output signal having a frequency and phase that is a function of the voltage magnitude of said phase comparator output signal
3. means for applying said voltage controlled means output to said phase comparator as said second input signal;
4. means responsive to and receiving said received digital pulses for providing an output signal that is differentiated digital pulses;
5. means responsive to and connecting to said differentiated means output signal for full-wave rectifying said signal to provide an output signal; and
6. means for applying said full-wave rectifying means output signal to said phase comparator as said first input signal whereby said voltage-controlled means output signal is a pulse train in synchronism with the timing of said received digital pulses when said phase-lock loop is in lock.